J. R. THORP ET AL

PEDAL

Jan. 12, 1932. Re. 18,331

Original Filed Oct. 22, 1929

Inventors
J. R. Thorp
C. Fausch
by W. H. Lieber
Attorney

Reissued Jan. 12, 1932 Re. 18,331

UNITED STATES PATENT OFFICE

JOEL R. THORP AND CLARENCE FAUSCH, OF WEST ALLIS, WISCONSIN, ASSIGNORS TO THE FULTON COMPANY, OF WEST ALLIS, WISCONSIN, A CORPORATION OF WISCONSIN

PEDAL

Original No. 1,821,588, dated September 1, 1931, Serial No. 401,431, filed October 22, 1929. Application for reissue filed December 2, 1931. Serial No. 578,568.

The present invention relates in general to improvements in foot manipulated lever structures, and relates more specifically to improvements in the construction and operation of pedal mechanisms for controlling or actuating various machines such as the engines of automobiles or the like.

An object of the invention is to provide an improved pedal structure which is relatively simple in construction and highly efficient in operation. Another object of the invention is to provide a pedal mechanism which is especially adapted to be detachably associated with the accelerator or other control devices for the engine of a motor driven vehicle. A further object of the invention is to provide an improved pivotally supported oscillatory lever which will effectively cooperate with a reciprocatory control rod adapted to be normally longitudinally shifted by means of an end enlargement on the rod, in order to actuate the rod. Still another object of the invention is to provide a new and useful automobile accessory which will facilitate the operation of motor cars, which may be readily applied or removed by a novice, and which presents a neat appearance. Still a further object of the invention is to provide an improved pedal structure which is simple, compact and rigid in construction, and which may be manufactured and sold at moderate cost. These and additional objects and advantages of the improvement, will be apparent from the following detailed description of the invention.

A clear conception of an embodiment of the present improvement, and of the mode of constructing and of operating devices manufactured in accordance therewith, may be had by referring to the drawings accompanying and forming a part of this specification in which like reference characters designate the same or similar parts in the several views.

Figure 1:
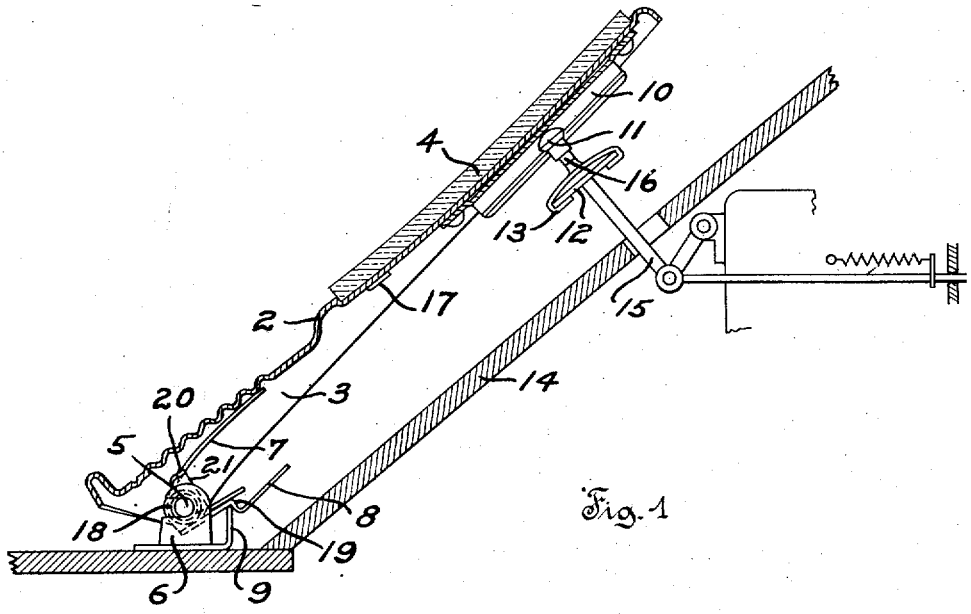
Fig. 1 is a vertical section through one of the improved pedal mechanisms, showing the same associated with the floor boards and with the accelerator rod of an automobile.
Figure 2:
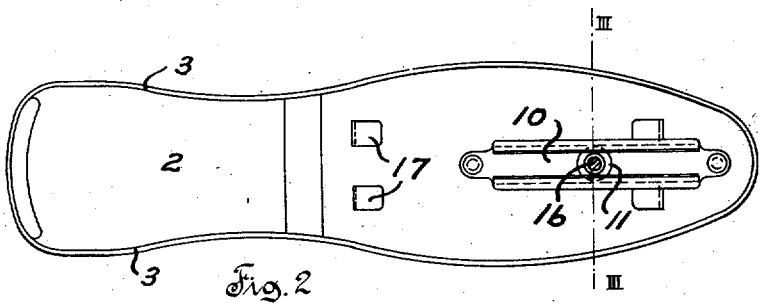
Fig. 2 is a bottom view of the pedal of the mechanism shown in Fig. 1, with the pivot pin, supporting bracket and actuating spring removed therefrom.
Figure 4:
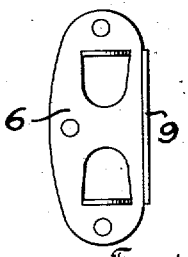
Fig. 4 is a top view of the pedal supporting bracket.
Figure 6:
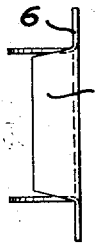
Fig. 6 is a front end view of the pedal supporting bracket.
Figure 7:
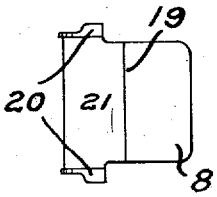
Fig. 7 is a top view of the spring holder of the improved pedal mechanism.

The improved pedal mechanism or structure specifically illustrated in the drawings, comprises in general an oscillatory sheet metal pedal member or pedal 2 having side walls 3 to the lower portions of which a pivot pin 5 is secured; a sheet metal bracket member or supporting bracket 6 having upstanding ears provided with notches 18 with which the pivot means or pin 5 is associable; a spring holder 21 and a resilient means or spring 7 carried by the pivot pin 5 and cooperable with the bracket 6 and with the pedal 2 respectively; a sheet metal track element 10 secured to the upper medial portion of the underside of the pedal 2; and a button 11 disposed within a longitudinal recess of the element 10 and having a support 16.

The pedal member or pedal 2 may be stamped from a single piece of sheet metal and has its upper portion recessed for the reception of a soft rubber pad 4 which may be held in position by means of metal cleats 17 passing through holes in the pedal and bent laterally beneath the same. The pivot means or pin 5 may be fastened to the side walls 3 of the pedal 2 in any suitable manner and the element 10 may be attached to the pedal 2 by riveting or welding.

The bracket means or supporting bracket 6 is likewise preferably formed from a single piece of sheet metal with the aid of dies, and has its forward end provided with an integral upturned stop flange 9. The stop flange 9 extends upwardly to about the centers of the notches 18, and the notches 18 open in a direction away from the flange 9. The supporting bracket 6 may be fastened to the horizontal floor board 14 by means of bolts or screws.

The spring holder 21 is also preferably stamped from a single plate of sheet metal, and is swingably supported upon the pivot pin 5 within the notched ears of the supporting bracket 6 when the structure is assembled. The holder 21 is provided with a detent 19 which is adapted to engage the upper edge of the flange 9 of the bracket 6, as shown in Fig. 1, and has an extension 8 projecting forwardly beyond the detent 19. The opposite sides of the spring holder 21 are provided with centralizing lugs 20 projecting outwardly over the upstanding ears of the supporting bracket 6 and adapted to coact with the side walls 3 of the pedal 2. The coil spring 7 embraces the pivot pin 5 and has its ends engaging the pedal 2 and the holder 21 respectively, as shown in Fig. 1. The formation and disposition of the spring 7 is such that the spring pressure constantly urges the pedal 2 upwardly away from the front inclined floor board 14 of the automobile, and the spring 7 may be compressed by pressing the holder extension 8 toward the underside of the pedal 2.

Figure 3:
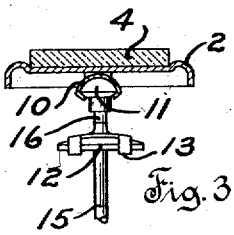
Fig. 3 is a transverse section through the pedal, taken along the line III—III of Fig. 2.
Figure 5:
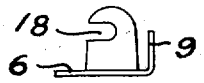
Fig. 5 is a side view of the pedal supporting bracket.
Figure 8:
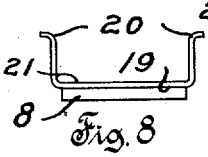
Fig. 8 is a rear end view of the spring holder.
Figure 9:
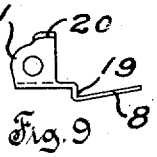
Fig. 9 is a side view of the spring holder.

The track element 10 may likewise be formed of a single piece of sheet metal with the aid of dies, and may be attached to the pedal 2 as hereinabove indicated. The element 10 is provided with a longitudinal recess having open opposite ends and of transverse cross-section substantially as shown in Fig. 3. The side walls of the element 10 are bent inwardly so as to positively prevent lateral removal of the button 11 from within the recess of the element 10, thus permitting removal of the button 11 only from an open end of the recess.

The button 11 has a substantially spherical zone surface coacting with and slidable along the upper surface of the recess of the track element 10, thus permitting slight tilting of the pedal 2 without jamming. The button 11 is rigidly attached to the upper end of a support 16 having distortable lugs 13 for effecting attachment of the button 11 to the head 12 of the accelerator rod 15. The accelerator rod 15 is longitudinally movable through an opening in the inclined floor board 14, and is normally retained in upper or ineffective position by means of a spring as shown in Fig. 1. The accelerator rod 15, head 12 and other elements associated with the rod 15 beneath the floor board, constitute standard equipment on most automobiles.

When the improved pedal mechanism has been assembled and associated with the accellerator rod 15 and head 12 of an automobile as shown in Figs. 1 and 3, application of foot pressure to the pedal 2 will cause the same to swing downwardly about the pivot pin 5, and to move the accelerator rod 15 downwardly, simultaneously compressing the spring 7. During such downward swinging of the pedal 2 about the pivot pin 5, the button 11 travels longitudinally within the recess of the track element 10, such relative movement of the button 11 being due to the fact that the accelerator rod 15 is longitudinally movable along a relatively fixed axis and cannot be shifted laterally to conform with the arc of movement of the pedal 2. Upon release of the downward pressure, the spring 7 and the return spring acting upon the accelerator rod 15, immediately become effective to swing the pedal 2 back to inactive position. The limits of travel of the pedal 2 should be such that the button 11 will not leave the open ends of the recess in the track element 10, during normal operation of the pedal 2.

If it becomes desirable to remove the pedal 2 from the bracket 6 and from the accelerator rod 15, the extension 8 of the holder 21 may be moved toward the underside of the pedal 2, thus compressing the spring 7 and disengaging the detent 19 from the upper edge of the flange 9. The pedal 2 may then be moved freely in a rearward direction until the pivot pin 5 disengages the notches 18 of the supporting bracket ears. During such rearward displacement of the pedal 2, the button 11 will slide longitudinally along the recess of the track element 10 and will eventually leave the recess through the forward open end thereof. The pedal 2 may obviously be restored to normal operating position by again pressing the extension 8 of the spring holder 21 toward the underside of the pedal 2 and by subsequently sliding the pivot pin 5 into the notches 18 and the button 11 into the recess of the track element 10, and finally releasing the extension 8 to permit the detent 19 to reengage the flange 9 of the bracket 6. When the spring holder 21 engages the flange 9 and the pedal 2 is released, the spring 7 quickly becomes effective to urge the pedal 2 upwardly as far as the button 11 permits.

From the foregoing description, it will be apparent that the invention provides a pedal structure which is simple and compact in construction and highly efficient in operation. The mechanism may obviously be readily applied to any standard automobile, and the pedal 2 may be conveniently applied and removed. The pedal structure is applicable to any reciprocating control rod other than the accelerator rod 15 shown herein. The various parts of the structure may be manufactured at minimum cost with the aid of punches and dies, and present a neat appearance when plated and polished. The improved pedal mechanism not only facilitates actuation of the accelerator, but also protects the floor of the car and the shoes of the operator against extreme local wear.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a longitudinally movable rod having an enlarged end portion, a substantially spherical button detachably associated with said rod portion, a pedal swingable over said rod portion, and an element secured to the medial lower portion of said pedal, said element having a recess within which said button is slidable and having side walls extending under the opposite sides of said button.

2. In combination, a longitudinally movable rod, a button detachably associated with the upper end of said rod, a pedal projecting over said button, and an element secured to the underside of said pedal, said element having an open ended recess through which said button is slidable and being formed to prevent lateral removal of said button from said recess.

3. In combination, a longitudinally movable rod, a button associated with the upper end of said rod, a swingable pedal projecting over said button, a spring for constantly urging said pedal away from said button, and an element secured to said pedal and having side walls formed to confine said button against lateral displacement of said button relative to said pedal.

4. In combination, a longitudinally movable rod having an enlarged upper end, a swingable pedal projecting over said rod end, a spring constantly urging said pedal away from said rod end, and an element secured to the underside of said pedal and having a recess slidably engaging said rod end, said element being formed to permit removal of said rod end only from an end of said recess.

5. In combination, a supporting bracket having rearwardly open notches and a transverse abutment in front of said notches, a pivot pin coacting with said notches, a pedal swingable upon said pin, a spring for urging said pedal in one direction, and a holder coacting with said spring and with said abutment to hold said pin within said notches.

6. In combination, a supporting bracket having upstanding ears provided with rearwardly open notches and also having an abutment flange disposed forwardly of said ears, a pedal having a supporting pivot pin coacting with said notches, a spring holder carried by said pin and having a detent engaging said flange, and a spring for urging said holder detent against said flange.

7. In combination, a bracket having upstanding ears provided with rearwardly open notches and also having an upstanding flange disposed forwardly of said ears, a pivot pin coacting with said notches, a pedal carried by said pin, a spring holder carried by said pin and having a detent engageable with said flange, and a spring coacting with said pedal and with said holder to urge said detent against said flange.

8. In combination, a supporting bracket having open notches and an abutment flange, a pivot pin coacting with said notches, a pedal having its lower portion pivotally associated with said pin, means for limiting the upward swinging motion of said pedal, a spring for urging said pedal upwardly with respect to said limiting means, and a spring holder coacting with said spring and with said flange to retain said pivot pin within said notches.

9. In combination, a bracket having rearwardly open notches and a flange disposed forwardly of said notches, a pedal having a pivot pin coacting with said notches, means coacting with said pedal remote from said pin for limiting the swinging movement of said pedal, a spring for urging said pedal away from said limiting means, and a spring holder coacting with said spring and with said flange to retain said pin within said notches.

10. In combination, a bracket having open notches, a pin coacting with said notches, a pedal carried by said pin, a spring coacting with said pedal, and a spring holder coacting with said spring and with a portion of said bracket to retain said pin within said notches, said pin being removable from said notches upon compression of said spring by movement of said holder toward said pedal.

11. In combination, a pedal having a track element associated with its bottom toe portion and having a pivot pin associated with its bottom heel portion, a button coacting with said element to limit the movement of said pedal in one direction, a bracket having open notches with which said pin cooperates, a spring holder carried by said pin and coacting with said bracket to retain said pin within said notches, and a spring for urging said pedal and said holder apart.

12. In combination, a bracket member, a pedal member, pivot means connecting said members, an auxiliary member swingable about the axis of said pivot means, yielding means tending to prevent said auxiliary member from swinging away from one of said two first-mentioned members, and means for releasably connecting one of said first-mentioned members and said auxiliary member.

13. In combination, a bracket member, a pedal member, pivot means connecting said members, an auxiliary member swingable about the axis of said pivot means, yielding means tending to prevent said auxiliary member from swinging away from one of said two first-mentioned members, and means associated with one of said first-mentioned members and coacting with said auxiliary member to releasably connect said coacting members.

14. In combination, a bracket member, a pedal member, means providing a releasable pivotal connection between said members, an auxiliary member swingable about the pivotal axis of said connection, yielding means tending to prevent said auxiliary member from swinging away from one of said two first-mentioned members, and means carried by one of said first-mentioned members and coacting with said auxiliary member to releasably connect said coacting members.

15. In combination, a bracket member, a pedal member, pivot means releasably connecting said members, an auxiliary member swingably supported by said pivot means, a spring tending to prevent said auxiliary member from swinging away from one of said two first-mentioned members, and means rigidly associated with one of said first-mentioned members and detachably coacting with said auxiliary member to releasably connect said two last-mentioned members.

16. In combination, a bracket member, a pedal member, pivot means releasably connecting said members, and an auxiliary member swingably supported by said pivot means and releasably interlockable with one of said two first-mentioned members to retain said pivot means in operative position.

In testimony whereof, the signatures of the inventors are affixed hereto.

JOEL R. THORP.
CLARENCE FAUSCH.